Aug. 10, 1926.
L. L. BLUEMLEIN
1,595,819
WATER HEATER
Filed June 18, 1925
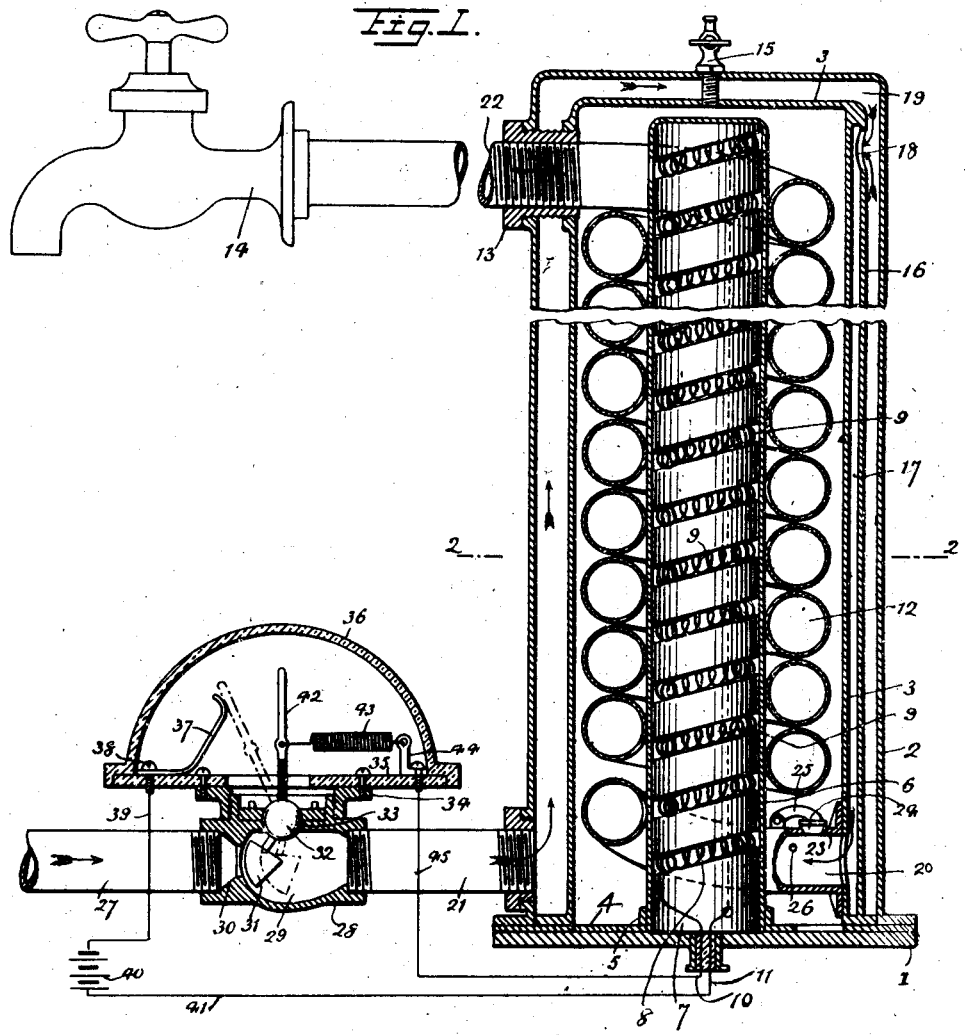
Fig. 1.
Fig. 2.
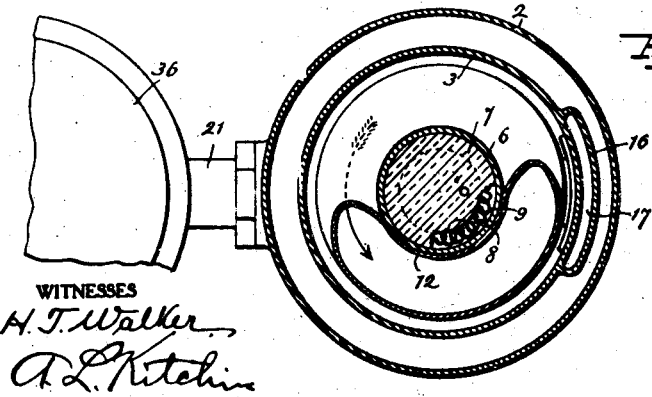
WITNESSES
INVENTOR
L. L. Bluemlein
BY
ATTORNEYS Patented Aug. 10, 1926.

1,595,819

UNITED STATES PATENT OFFICE.

LUDWIG L. BLUEMLEIN, OF HARTSDALE, NEW YORK.

WATER HEATER.

Application filed June 15, 1925. Serial No. 38,030.

This invention relates to a water heater and particularly to an improved heater wherein improved electric means are provided for heating the water immediately before it is discharged.

Another object of the invention is to provide an electric water heater wherein a pressure actuated switch is provided and used to turn on the current immediately upon the flowing of water through the heater.

A further object of the invention, more specifically, is to provide a water heater wherein the flow of water into the heater turns on the current instead of the change of temperature.

An additional object is to provide a water heater wherein the water is caused to pass around the jacket before passing through the heater and in this way have the temperature thereof raised before entering the heating coils.

In the accompanying drawing:—

Figure 1 is a longitudinal vertical sectional view through a heater, disclosing an embodiment of the invention.

Figure 2 is a transverse sectional view through Figure 1 on line 2—2.

Referring to the accompanying drawing by numerals, 1 indicates a bottom to which a cylindrical casing 2 is secured by welding, rivets or in any desired manner. Also to the base 1 an inner casing 3 is secured by welding or in any desired manner. Preferably, a plate 4 is also connected with the bottom 1 and formed with an annular flange 5 into which snugly fits the tube 6 which is closed at the upper end. Snugly fitting in the tube 6, which is of metal, is a filler block 7 of any desired material which is fireproof, as for instance, porcelain. The filler 7 is formed with a spiral groove 8 in which a heating coil 9 is mounted. The groove 8 is sufficiently deep to permit the coil 9 to be arranged therein without coming in contact with the tube 6. A pair of lead-in-wires 10 and 11 are provided, one wire extending to one end of the coil 8 and the other wire to the opposite end. Surrounding the tube 6 is a heating coil 12 which passes through a suitable sleeve or nipple 13 and is connected in any suitable manner with the valve or spigot 14. An air relief valve 15 extends through the casing 2 and into the inner casing 3 whereby air may be exhausted from the inner casing at any time. The inner casing 3 is provided with a parallel section 16 as shown in Figure 2 connected at the ends to the casing so as to present a passage-way 17 extending from the top to the bottom of casing 3. An opening 18 is provided in the section 16 near the top so that water from the chamber or space 19 between the casings 2 and 3 may pass through opening 18 into the passage-way 17 thence into the inlet end 20 of the heating coil 12.

From Figure 1 it will be noted that the water enters the space or chamber 19 through pipe 21 and passes upwardly and finally through opening 18 and from this opening the water passes downwardly through the passage-way 17 and from thence through the heating coil 12 and finally out the discharge pipe 22 which is secured to the valve 14. The coil 12 at the entrance 20 is provided with an aperture 23 normally closed by the valve 24 which is secured to a pivotally mounted member 25 acting normally to cause the valve 24 to close the aperture 23. A very small vent 26 is provided near the aperture 23, said vent permitting water to pass from the interior of casing 3 back into the heating coil 12. When the water is first turned on, the same will fill the chamber 19, passage-way 17, coil 12 and as the pressure is built up, valve 24 will be raised and water will be discharged into the interior of the inner casing 3 until the same is filled. In order that the water may completely fill the inner casing 3, valve 15 is allowed to remain open for the escape of air until water begins to escape therefrom whereupon the same is closed and the heater is in condition for use. When the water in the inner casing 3 is heated, the same will transmit heat to the watering coil 12, which water may be drawn off from time to time as desired. As the water in the inner casing 3 becomes heated, it will expand somewhat and this expansion is taken care of by the vent aperture 26.

The water supplied to the chamber 19 is supplied through pipe 21 which is connected to any suitable source by pipe 27 through the valve 28. In order to turn on the electricity and turn the same off automatically and at the proper time, the valve 28 is associated with certain switch mechanism interposed in the circuit of the lead-in-wires 10 and 11. The valve 28 is provided with a rather large chamber 29 and a valve seat 30 which co-acts with a valve member 31 which is preferably hollow and in the nature of a float so that it may be easily moved by the pressure of water.

This valve member is connected to a ball 32 accurately ground so as to fit into a valve seat 33. A member 34 acting as a bracket is screwed onto an extension of valve 28 and carries a plate 35 which is of glass or other insulating material and on which is mounted a covering 36 preferably of glass. A spring contact 37 is connected to the plate 35 by a screw 38, which screw is also connected to the wire 39. The wire 39 is connected to one side of the battery or other source of current 40, which battery has a wire 41 extending to the lead-in-wire 11. An arm 42 is connected with the ball 32 but is insulated therefrom by suitable insulation, said arm being formed with a metal upper end adapted to engage the spring 37 for closing the circuit of battery 40. A spring 43 is connected at one end to the arm 42 and the other to bracket 44, which bracket is connected through wire 45 to the lead-in-wire 10. Normally, the spring 43 and associated parts assume the position shown in Figure 1 but when the valve 14 is turned and the water begins to flow through the heater, the pressure of water against the valve member 31 will swing the same to the dotted position shown in Figure 1 whereupon the water may freely pass into the heater and arm 42 brought over into contact with spring 37, thus closing the circuit of the heating coil 9. It will thus be seen that the current is turned on immediately upon opening valve 14 and as soon as this valve is closed, the pressure against valve member 31 will cease so that spring 42 will immediately function for opening the circuit and moving valve member 31 to a closed position. It will be understood that the valve member 31 need not make a water tight connection with its seat and in fact, may not touch the seat if desired but is merely positioned in the path of flow of water so as to be moved by the pressure thereof a sufficient distance for closing the circuit. The spring 43 is sufficiently strong to move the arm 42 away from spring 37 when there is no flow of water but immediately upon even a slight flow of water the pressure will cause the arm to move over into contact whereby the current will be turned on to the heating coil.

What I claim is:

1. An electric heater, comprising a heating coil, an electric heating element for heating said coil and the water therein, means for directing water into said heating coil, a valve member interposed in said means, an electric switch connected with said valve member in such a manner as to be closed when the valve member is open, a spring for opening said switch and simultaneously closing said valve member, and means forming a circuit for said heating element, said means including a source of current and said switch.

2. An electric heater, comprising a heating coil, a container surrounding said coil, an electrical heating element arranged within said coil, a water jacket surrounding and spaced from said container, means for directing water into the lower part of said water jacket, means for directing water from the upper part of said water jacket into said heating coil at the lower end thereof, and means for turning current onto and off of said heating element.

3. A water heater, comprising a heating coil, a container surrounding said coil, a water jacket surrounding said container and spaced therefrom, said coil at the lower end being formed with an opening through which water may pass into said container so as to surround said coil exteriorly, a heating element fitted interiorly of said coil, said heating element acting to heat the water in said container which will be transmitted to the water in the heating coil, means for directing water into the jacket exteriorly of the container, and means for directing water from the top of said jacket to said coil at the lower end whereby the water will be heated in a preliminary manner before it enters the heating coil and also whereby most of the heat radiated from said container will be absorbed by the water in the water jacket.

4. In an electric water heater, a heating coil, an electric heater fitted into said coil, means for directing water into said coil, a valve interposed in said means, said valve having an insulated handle, a contact co-acting with said handle, a spring normally holding said handle away from said contact, said valve being capable of being opened by the pressure of water passing into said coil, the opening of said valve causing said handle to engage said contact, and an electric circuit for said heating element, said circuit including a source of current, said contact and said arm.

5. A water heater, comprising a heating element, a heating coil surrounding said heating element, a container surrounding said coil, said container being formed with means at one point presenting a passageway from the bottom to the top, said passage-way being exteriorly positioned in respect to the container and open near the top, a water jacket surrounding said container and spaced therefrom, means including a valve for directing water into the lower part of said water jacket, said water jacket being adapted to pass through said aperture downwardly through said passageway, the lower end of said passage-way being open to the lower end of said heating coil, means for drawing off water from the upper end of said heating coil, an electric circuit for said heating element, and a switch connected with said valve and adapted to be closed thereby when water is flowing into said water jacket.

LUDWIG L. BLUEMLEIN.